United States Patent
Cowelchuk et al.

(10) Patent No.: US 7,404,996 B2
(45) Date of Patent: Jul. 29, 2008

(54) TWO-SHOT POLYMERIC COMPONENT WITH ATTACHMENT FEATURE AND METHOD OF PRODUCING SAME

(75) Inventors: Glenn Cowelchuk, Chesterfield Township, MI (US); Randy S. Reed, Fair Haven, MI (US); Michael P. Schoemann, Waterford, MI (US); John D. Youngs, Southgate, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 746 days.

(21) Appl. No.: 10/821,058

(22) Filed: Apr. 8, 2004

(65) Prior Publication Data

US 2005/0227042 A1  Oct. 13, 2005

(51) Int. Cl.
*B32B 3/24* (2006.01)
*B60J 5/00* (2006.01)

(52) U.S. Cl. .................. 428/140; 428/139; 428/99; 428/100; 296/146.7

(58) Field of Classification Search ............... 428/139, 428/140, 99, 100; 296/146.7
See application file for complete search history.

(56) References Cited

U.S. PATENT DOCUMENTS

| | | | |
|---|---|---|---|
| 3,576,304 A | 4/1971 | Gillemot | |
| 4,572,466 A | 2/1986 | Yamaguchi et al. | |
| 4,854,037 A | 8/1989 | DeSanto | |
| 5,005,242 A | 4/1991 | Kennedy et al. | |
| 5,101,539 A | 4/1992 | Kennedy et al. | |
| 5,354,021 A | 10/1994 | Farrell | |
| 5,828,009 A | 10/1998 | James et al. | |
| 6,186,451 B1 | 2/2001 | Benoit | |
| 6,610,929 B1 | 8/2003 | Motokawa | |
| 2003/0194542 A1 | 10/2003 | Springer | |
| 2004/0247828 A1* | 12/2004 | Brozenick et al. | 428/139 |
| 2005/0042421 A1* | 2/2005 | Schwarzwalder et al. | 428/137 |

OTHER PUBLICATIONS

Polymer Technology product information accessed through www.polymertechnology.com on Apr. 8, 2004.

* cited by examiner

*Primary Examiner*—William P Watkins, III
(74) *Attorney, Agent, or Firm*—Brooks Kushman P.C.

(57) ABSTRACT

The present invention provides a two-shot injection molded polymeric component having first and second shots made from polymeric materials. The first shot is made from a relatively hard polymeric material, while the second shot is made from a polymeric material which may differ from the first shot by way of color or polymer type. In this way, the second shot provides texture and aesthetic value to the component. Integrally molded with the second shot is an attachment feature that allows an accessory to be attached proximate the back side of the component without the use of a separate fastener or other separate attachment feature.

15 Claims, 4 Drawing Sheets

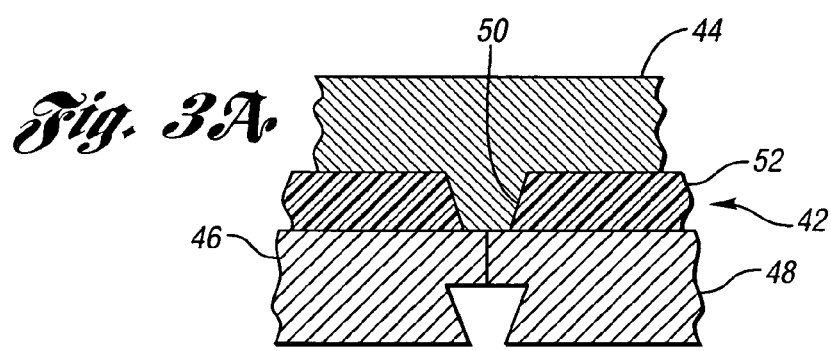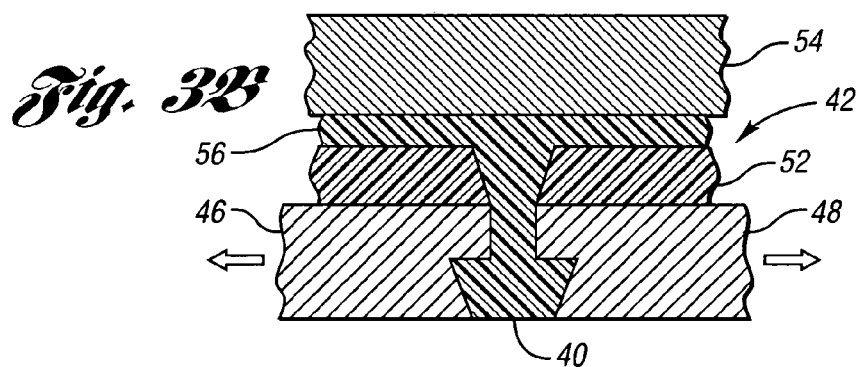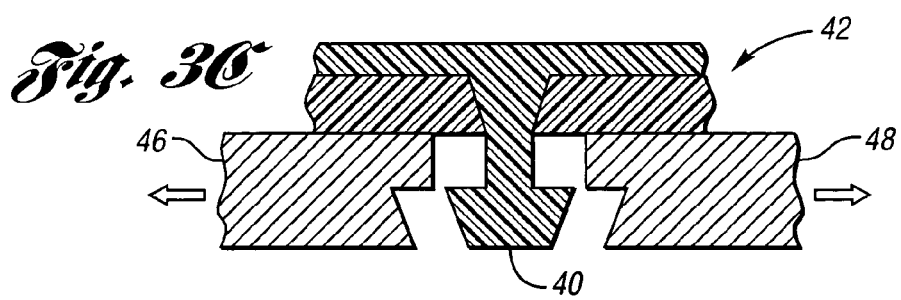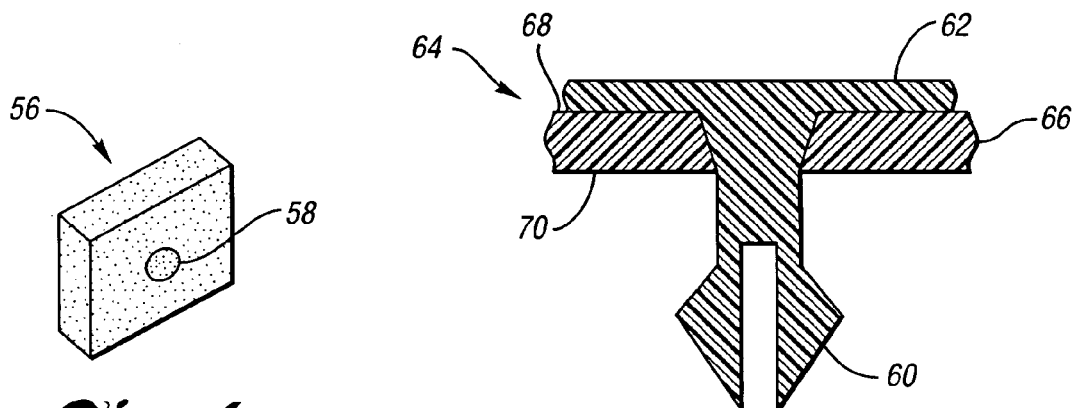

TWO-SHOT POLYMERIC COMPONENT WITH ATTACHMENT FEATURE AND METHOD OF PRODUCING SAME

BACKGROUND OF THE INVENTION

1. Field of the Invention

The present invention relates to a two-shot polymeric component with an attachment feature, and a method of producing such a component.

2. Background Art

In vehicles it is common to provide a number of different accessories behind an interior trim panel. For example, electrical wires, and thus wiring harnesses, are run throughout a vehicle behind various trim panels, such as an instrument panel or a door panel. To reduce the movement of a wiring harness, and the noise associated with it, the harness is often attached to the back side of the trim panel. To accomplish this, a cable tie may be disposed around the wiring harness and attached to the back side of the trim panel. To accommodate other components, such as an audio speaker or a noise absorption pad, other types of attachment mechanisms may be utilized to secure the component to the back of the trim panel. In each case, the attachment mechanism requires the use of one or more separate fasteners, the use of which can increase assembly time and overall vehicle cost.

Therefore, a need exists to integrate various attachment features, or fastening elements, into a vehicle trim panel to eliminate the need for separate fasteners to attach components proximate the back side of the trim panel.

SUMMARY OF THE INVENTION

Accordingly, the present invention provides an attachment feature integrated into a vehicle trim panel that eliminates the need for a separate fastener.

The present invention also provides an attachment feature integrated into one shot of a two-shot injection molded trim panel, where the attachment feature is disposed proximate a back side of the trim panel.

The present invention further provides a two-shot injection molded polymeric component. The component includes a first portion that is made from a polymeric material and includes first and second opposing sides. A second portion is made from a polymeric material, with at least some of the second portion being disposed adjacent the first side of the first portion, and at least some of the second portion being disposed adjacent the second side of the first portion. The second portion includes an attachment feature integrally molded therewith. The attachment feature is configured to facilitate attachment of an object to be attached proximate one side of the first portion.

The invention also provides a two-shot injection molded automotive interior trim component. The component includes a structural portion made from a polymeric material and including a show side and a back side opposite the show side. A skin made from a polymeric material has a portion disposed adjacent the show side and a portion disposed adjacent the back side. The skin includes an attachment feature integrally molded therewith. The attachment feature is disposed proximate the back side and configured to facilitate attachment of an automotive accessory proximate the back side.

The invention further provides a method of producing a polymeric component having an integral attachment feature. The method includes injection molding a first portion from a polymeric material. The first portion includes first and second opposing sides. A second portion, including an integral attachment feature, is injection molded from a polymeric material such that at least some of the second portion is disposed adjacent the first side of the first portion, and at least some of the second portion is disposed adjacent the second side of the first portion. The attachment feature is molded proximate one side of the first portion, and is configured to facilitate attachment of an object to be attached proximate the one side of the first portion.

BRIEF DESCRIPTION OF THE DRAWINGS

FIGS. 3A-3C are fragmentary sectional views of a portion of a mold used to produce an alternative embodiment of the present invention;

FIG. 4 is a schematic representation of an automotive accessory configured for attachment to the polymeric component shown in FIG. 3C;

FIG. 5 is a fragmentary sectional view of a second alternative embodiment of the present invention;

DETAILED DESCRIPTION OF THE PREFERRED EMBODIMENT(S)

Figure 1A:
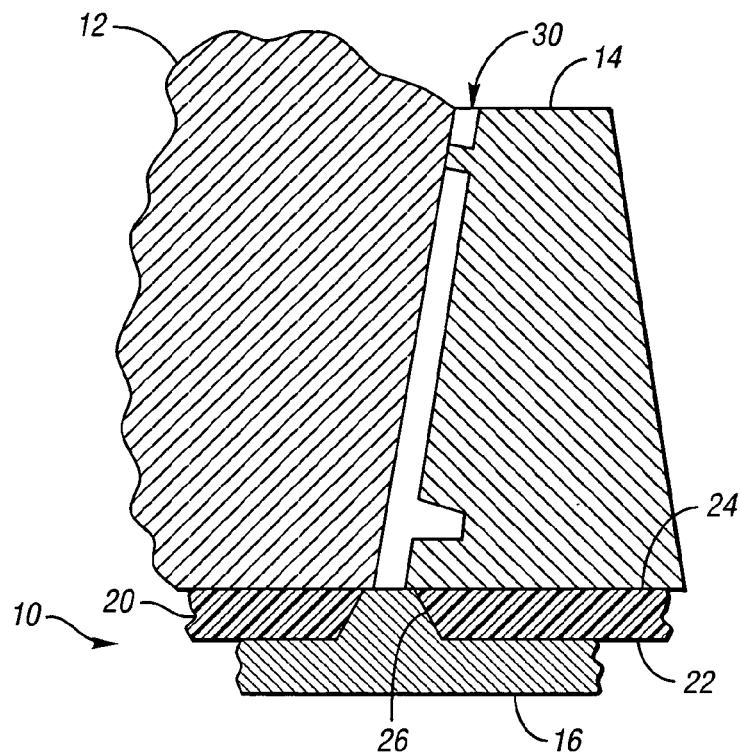
FIGS. 1A-1C are fragmentary sectional views of portions of a mold used to produce a two-shot polymeric component in accordance with the present invention.
Figure 1B:
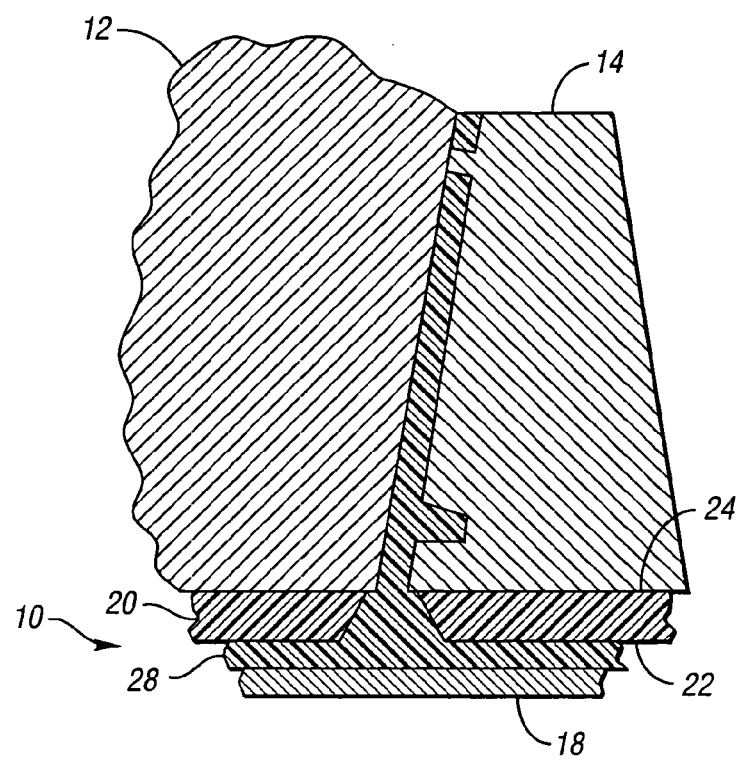
Figure 1C:
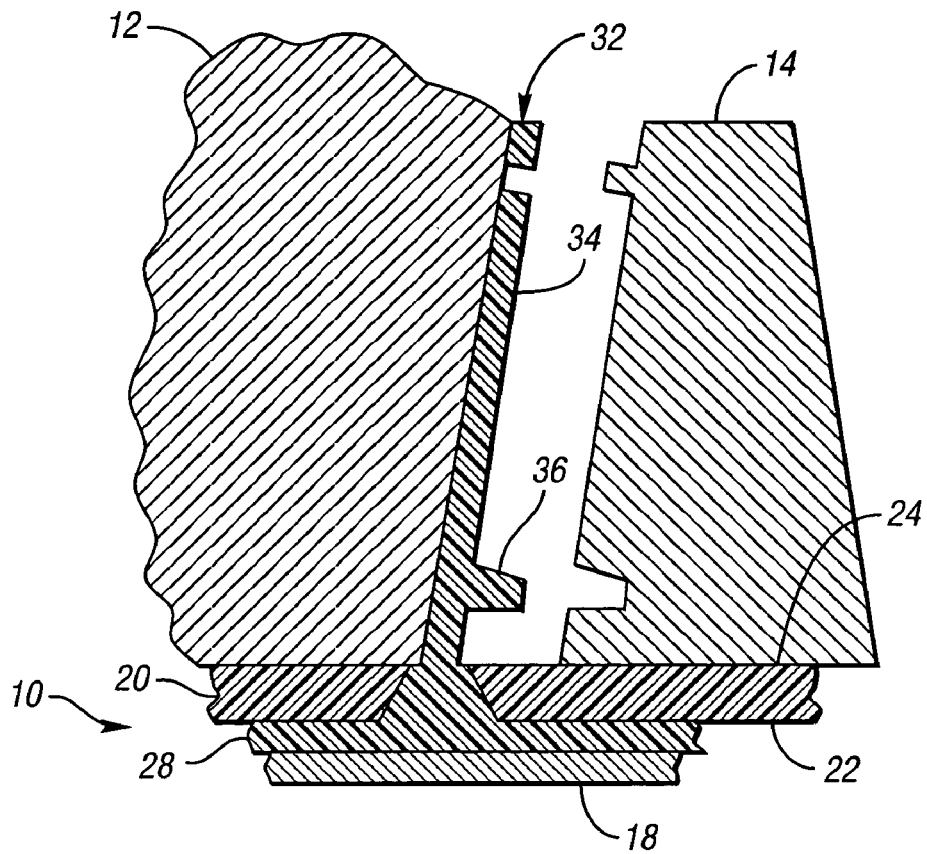

FIGS. 1A-1C illustrate a method of producing a polymeric component, in this embodiment a vehicle interior trim component 10, in accordance with the present invention. FIGS. 1A-1C show a cross-sectional view of a mold used to produce the trim component 10. A mold core 12 cooperates with a lifter 14 and first and second mold cavities 16, 18 to produce the trim component 10. A first portion, or first shot 20, of the trim component 10 is injection molded from a polymeric material. Although the material used for the first portion 20 may vary depending on the particular application, materials such as polypropylene, acrylonitrile butadiene styrene (ABS) and polycarbonate ABS (PC-ABS) are effective for many vehicle interior trim component applications. Thus, the trim component 10 may be a vehicle door panel, an instrument panel, or some other trim component within the vehicle.

The first shot 20 includes first and second opposing sides 22, 24. Upon installation into a vehicle, the first side 22 will face the interior of the vehicle, and thus may be called a show side. Conversely, the second side 24 will not be visible to vehicle occupants, and thus may be called a back side. As shown in FIG. 1A, the first cavity 16 is maintained proximate the mold core 12 when the first shot 20 is being molded. This forms an aperture 26 through the first shot 20 that facilitates communication between the show side 22 and the back side 24.

After the first shot 20 is molded, the first cavity 16 is moved away from the core 12 and lifter 14, and a second cavity 18 is put in place—see FIG. 1B. In practice, the first and second cavities 16, 18 can be configured to move linearly and/or rotate in and out of position. Thus, the core 12 and lifter 14 can remain stationary while the cavities 16, 18 move in and out of position to facilitate the two-shot molding process. After the second cavity 18 is in place, a second portion, or second shot 28, is molded. The second shot 28 fills a gap between the second cavity 18 and the first shot 20. It also fills a gap 30 that is between the core 12 and the lifter 14. Thus, at least some of the second shot 28 will be disposed adjacent both sides 22, 24 of the first shot 20. As with the first shot 20, the second shot 28 can be made from any number of polymeric materials.

For purposes of a vehicle trim component, such as the trim component 10, it may be desirable to use a different material for the second shot 28 than is used for the first shot 20. This not only provides a variation in texture, but adds to the aesthetics of the vehicle interior. Of course, the second shot 28 can be made from the same material as the first shot 20, but may, for example, be provided in a different color. The second shot 28 can be made from a variety of thermoplastic elastomers (TPE), thermoplastic polyolefins (TPO), or thermoplastic vulcanizates (TPV). Alternatively, as noted above, the second shot 28 can also be made from a harder material, such as an ABS, just like the first shot 20. In some cases it may be desirable to choose the polymeric materials for the first and second shots 20, 28 to be compatible, such that a chemical bond is formed between the two polymers during the molding process. As explained more fully below, the geometry of the second shot may be configured to retain the second shot proximate the first shot, thereby eliminating the need for a chemical bond between the first and second shots.

Figure 2:
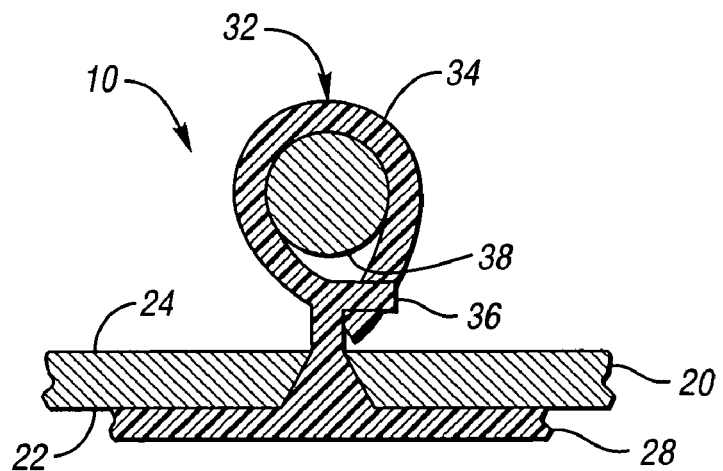
FIG. 2 is a fragmentary sectional view of a two-shot polymeric component including an attachment feature retaining a wiring harness.

After the first and second shots 20, 28 are molded, the lifter 14 can be retracted from the core 12 to facilitate removal of the trim component 10 from the mold—see FIG. 1C. Where the first shot 20 is made from a relatively hard polymer, such as a polypropylene, it forms a structural portion of the trim component 10, while the second shot 28 forms a skin which covers a portion of the show side 22. Adjacent the back side 24 of the first shot 20, the second shot 28 forms an attachment feature 32 configured to facilitate attachment of an automotive accessory proximate the back side 24. In particular, the attachment feature 32 includes an elongate member 34 and a connection member 36. As shown in FIG. 2, the elongate member 34 is configured to wrap around a portion of an automotive accessory, such as wiring harness 38, and to cooperate with the connection member 36 to retain the wiring harness 38 proximate the back side 24 of the first shot 20.

The attachment feature 32 is in the form of a loop that is integrally molded with the second shot 28. Although a loop is effective to retain certain automotive accessories, such as the wiring harness 38, the present invention also contemplates the use of different types of attachment features integrally molded with a second shot of a two-shot polymeric component. Turning to FIGS. 3A-3C the manufacture of a different type of attachment feature—i.e., a clip, or a Christmas tree 40—is illustrated. To facilitate manufacture of a trim component 42 that includes the Christmas tree 40, a similar method to that illustrated in FIGS. 1A-1C is used. In FIG. 3A, a first mold cavity 44 is maintained proximately two slides 46, 48. The cavity 44 cooperates with the slides 46, 48 such that an aperture 50 is formed when a first portion, or first shot 52, is molded—see FIG. 3A. After the first shot 52 is molded, the slides 46, 48 are moved apart from each other as indicated by the directional arrows in FIG. 3B. In addition, the first mold cavity 44 is replaced by a second mold cavity 54. The second shot 56 is then molded, including the Christmas tree attachment feature 40. Finally, as shown in FIG. 3C, the slides 46, 48 are moved even farther from each other to facilitate removal of the trim component 42 from the mold.

An attachment feature, such as the Christmas tree 40, may be used to attach a number of different automotive accessories to the trim component 42. For example, FIG. 4 shows a generic automotive accessory 56 that contains an aperture 58, which can be a blind hole or a through hole. The automotive accessory 58 may be an audio speaker, a noise absorption pad, or a bolster pad. In fact, any device having an aperture configured to cooperate with a Christmas tree fastener can be attached proximate the back side of the trim component 42.

FIG. 5 illustrates another type of clip attachment feature, commonly known as a bird's beak 60. The bird's beak 60 is integrally molded with a second shot 62 of a two-shot polymeric component 64. As in the other embodiments, the polymeric component 64 includes a first shot 66, and the second shot 62 has a portion disposed on first and second sides 68, 70 of the first shot 66. The bird's beak 60, like the Christmas tree 40, is configured to cooperate with an aperture in a device to retain the device proximate the second side 70 of the first shot 66.

Figure 6:
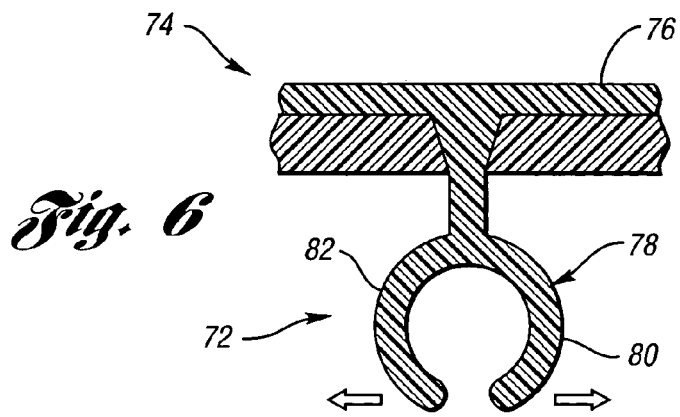
FIG. 6 is a fragmentary sectional view of a third alternative embodiment of the present invention.

FIG. 6 shows yet another type of attachment feature 72 that is part of a two-shot polymeric component 74. The attachment feature 72 is integrally molded with a second shot 76, and includes a clamp portion 78. The clamp portion 78 includes a pair of arms 80, 82. As indicated by the directional arrows, the arms 80, 82 are elastically flexible, which facilitates receiving and retaining an object such as the wiring harness 38 shown in FIG. 2. This also facilitates removal of the component 74 from a mold. The stiffness of the arms 80, 82 is a function of their size, shape, and the material from which the second shot 76 is made. Thus, an attachment feature, such as the attachment feature 72, may be configured with different retention strengths depending on the desired application.

Figure 7A:
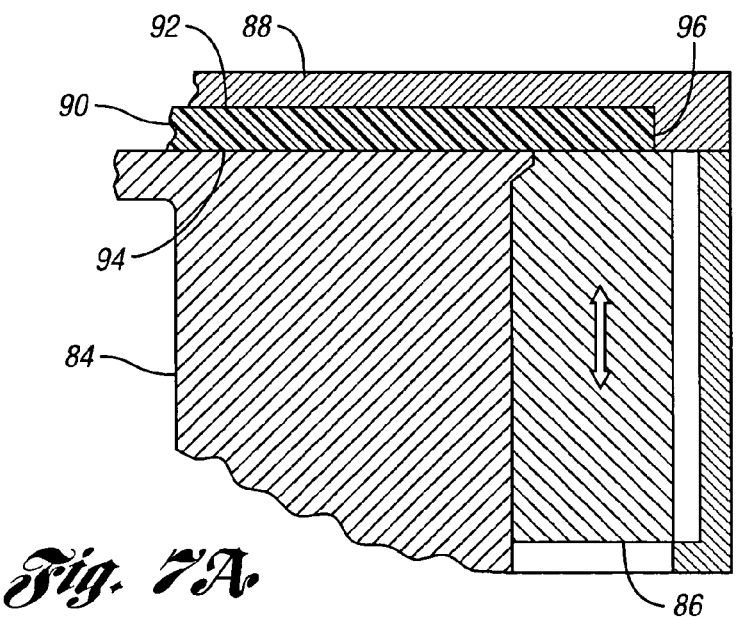
FIGS. 7A-7B are fragmentary sectional views of a portion of a mold used to produce a fourth alternative embodiment of the present invention.
Figure 7B:
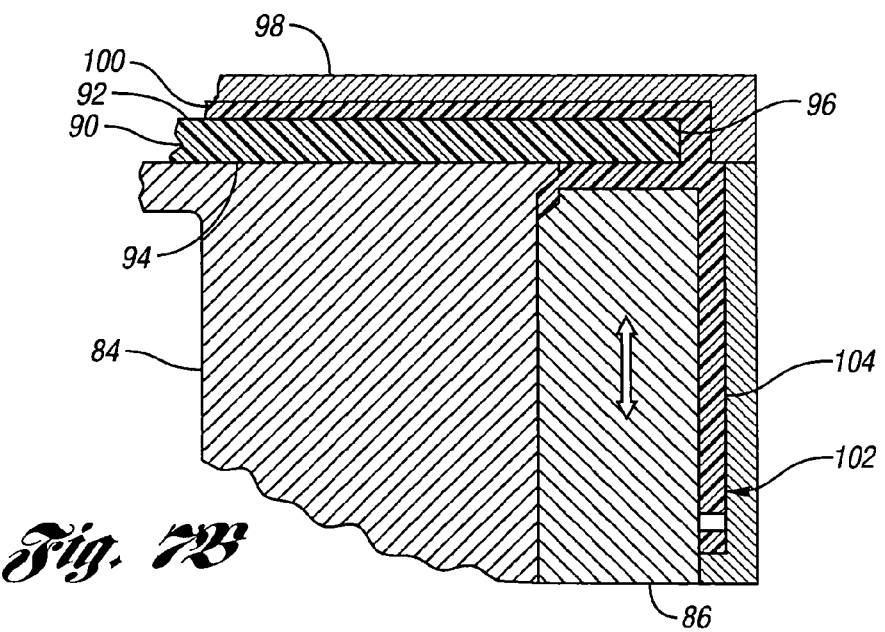

In each of the previously illustrated embodiments, the first shot of the two-shot polymeric component included an aperture therethrough to allow the second shot to be disposed on either side of the first shot. FIGS. 7A and 7B illustrate an alternative method for accomplishing the same result. As illustrated in FIG. 7A, a mold includes a core 84, a slide 86, and a first mold cavity 88. Each of these components cooperates to facilitate molding of a first shot 90. In addition to first and second sides 92, 94, the first shot 90 also includes an edge 96 adjacent the first and second sides 92, 94. After the first shot 90 is molded, the slide 86 is moved back from the second side 94 of the first shot 90. In addition, the first mold cavity 88 is replaced with a second mold cavity 98—see FIG. 7B. This change creates a number of gaps between the cooperating parts, such that a second shot 100 is molded to traverse the edge 96 thereby allowing some of the second shot 100 to be disposed on both sides 92, 94 of the first shot 90.

As shown in FIG. 7B, the second shot 100 includes an attachment feature 102 that is similar to the attachment feature 32 shown in FIG. 1C. The attachment feature 102 includes an elongate member 104 and a connection member 106 which cooperate with each other to wrap around and retain a portion of an object, such as the wiring harness 38 shown in FIG. 2. Because of the configuration of the attachment feature 102, such that the connection member is disposed along a length of the second side 94, the attachment feature 102 retains the second shot 100 proximate the first shot 92. This eliminates the need for a chemical bond between the first and second shots 92, 100. Thus, this configuration can allow greater flexibility in the choice of materials because a chemical bond between the two polymers may not be required.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A two-shot injection molded polymeric component, comprising:
    a first injection molded portion made from a polymeric material and including first and second opposing sides; and
    a second injection molded portion made from a polymeric material, and formed such that at least some of the second portion is disposed adjacent the first side of the first portion and at least some of the second portion is disposed adjacent the second side of the first portion, the second portion including an attachment feature integrally molded therewith, the attachment feature being configured to facilitate attachment of an object to be attached proximate one side of the first portion.

2. The polymeric component of claim 1, wherein the first portion includes an aperture disposed therethrough for facilitating communication between the first side and the second side, and wherein the second portion traverses the aperture, thereby allowing at least some of the second portion to be disposed adjacent the first side and at least some of the second portion to be disposed adjacent the second side.

3. The polymeric component of claim 1, wherein the first portion includes an edge adjacent the first and second sides, and wherein the second portion traverses the edge, thereby allowing at least some of the second portion to be disposed adjacent the first side and at least some of the second portion to be disposed adjacent the second side.

4. The polymeric component of claim 1, wherein the attachment feature is further configured to retain the second portion proximate the first portion, thereby eliminating the need for a chemical bond between the first and second portions.

5. The polymeric component of claim 1, wherein the attachment feature includes an elongate member and a connection member, the elongate member being configured to wrap around a portion of the object to be attached and to cooperate with the connection member to retain the object to be attached proximate one side of the first portion.

6. The polymeric component of claim 1, wherein the attachment feature includes a clamp portion having a pair of arms, the arms being elastically flexible to facilitate receiving and retaining the object to be attached.

7. The polymeric component of claim 1, wherein the first portion is made from a polymeric material that includes a polypropylene, and the second portion is made from a polymeric material that includes a thermoplastic elastomer.

8. A two-shot injection molded automotive interior trim component, comprising:
    a structural portion made from a polymeric material and including a show side and a back side opposite the show side; and
    a skin made from a polymeric material, a portion of the skin being formed adjacent the show side and a portion of the skin being formed adjacent the back side, the skin including an attachment feature integrally molded therewith, the attachment feature being disposed proximate the back side and configured to facilitate attachment of an automotive accessory proximate the back side.

9. The trim component of claim 8, wherein the structural portion includes an aperture disposed therethrough for facilitating communication between the show side and the back side, and wherein the skin traverses the aperture, thereby allowing a portion of the skin to be disposed adjacent the show side and a portion of the skin to be disposed adjacent the back side.

10. The trim component of claim 8, wherein the structural portion includes an edge adjacent the show side and the back side, and wherein the skin traverses the edge, thereby allowing a portion of the skin to be disposed adjacent the show side and a portion of the skin to be disposed adjacent the back side.

11. The trim component of claim 8, wherein the attachment feature is further configured to retain the skin proximate the structural portion, thereby eliminating the need for a chemical bond between the skin and the structural portion.

12. The trim component of claim 8, wherein the attachment feature includes an elongate member and a connection member, the elongate member being configured to wrap around a portion of the automotive accessory and to cooperate with the connection member to retain the automotive accessory proximate the back side of the structural portion.

13. The trim component of claim 8, wherein the attachment feature includes a clamp portion having a pair of arms, the arms being elastically flexible to facilitate receiving and retaining the automotive accessory.

14. The trim component of claim 8, wherein the attachment feature is configured to facilitate attachment of at least one of a wiring harness, an audio speaker, a noise absorption pad, and a bolster proximate the back side.

15. The trim component of claim 8, wherein the attachment feature includes a clip configured to cooperate with an aperture in the automotive accessory for retaining the automotive accessory proximate the back side.

* * * * *